Oct. 19, 1965
W. A. McLEISH ET AL
3,212,626
SUSPENDED BELT CONVEYOR
Filed March 15, 1962
3 Sheets-Sheet 1
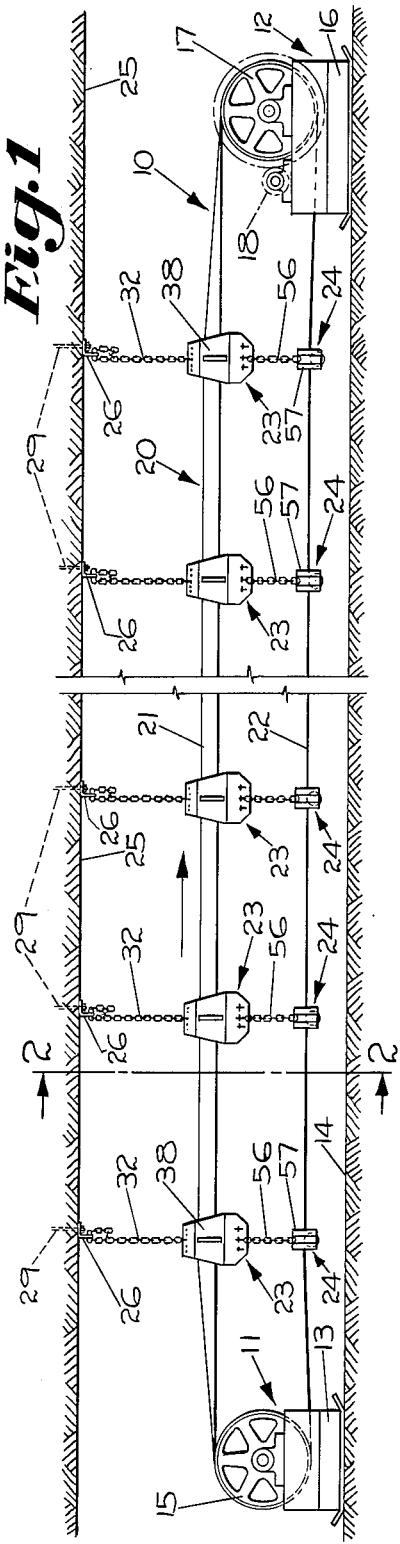
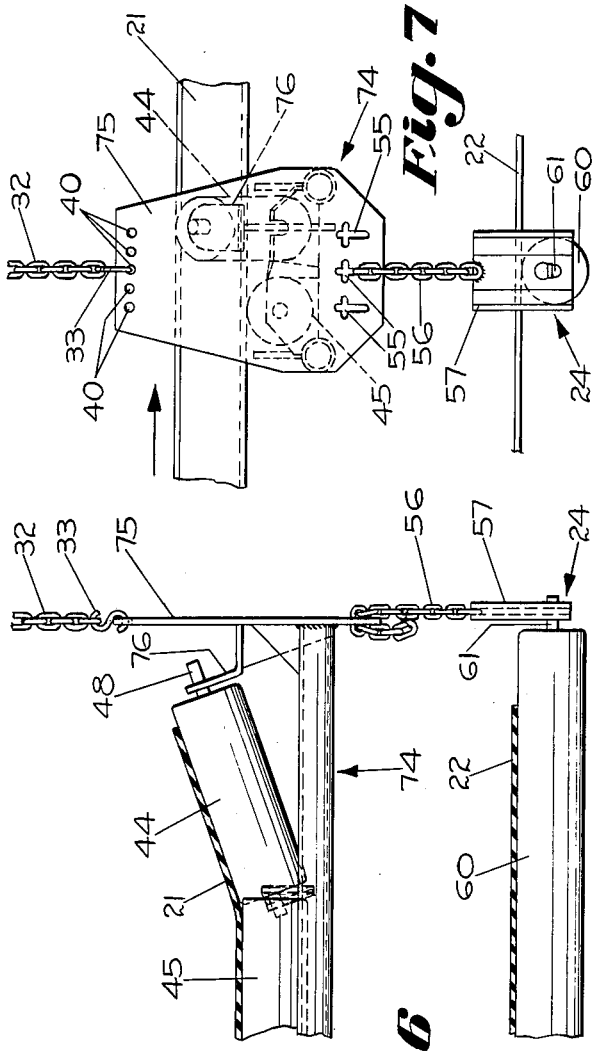
INVENTORS;
WILLIAM A. McLEISH
BYRON L. WALDRUFF,
BY David Young
ATTY.

Oct. 19, 1965  W. A. McLEISH ETAL  3,212,626
SUSPENDED BELT CONVEYOR
Filed March 15, 1962  3 Sheets-Sheet 2
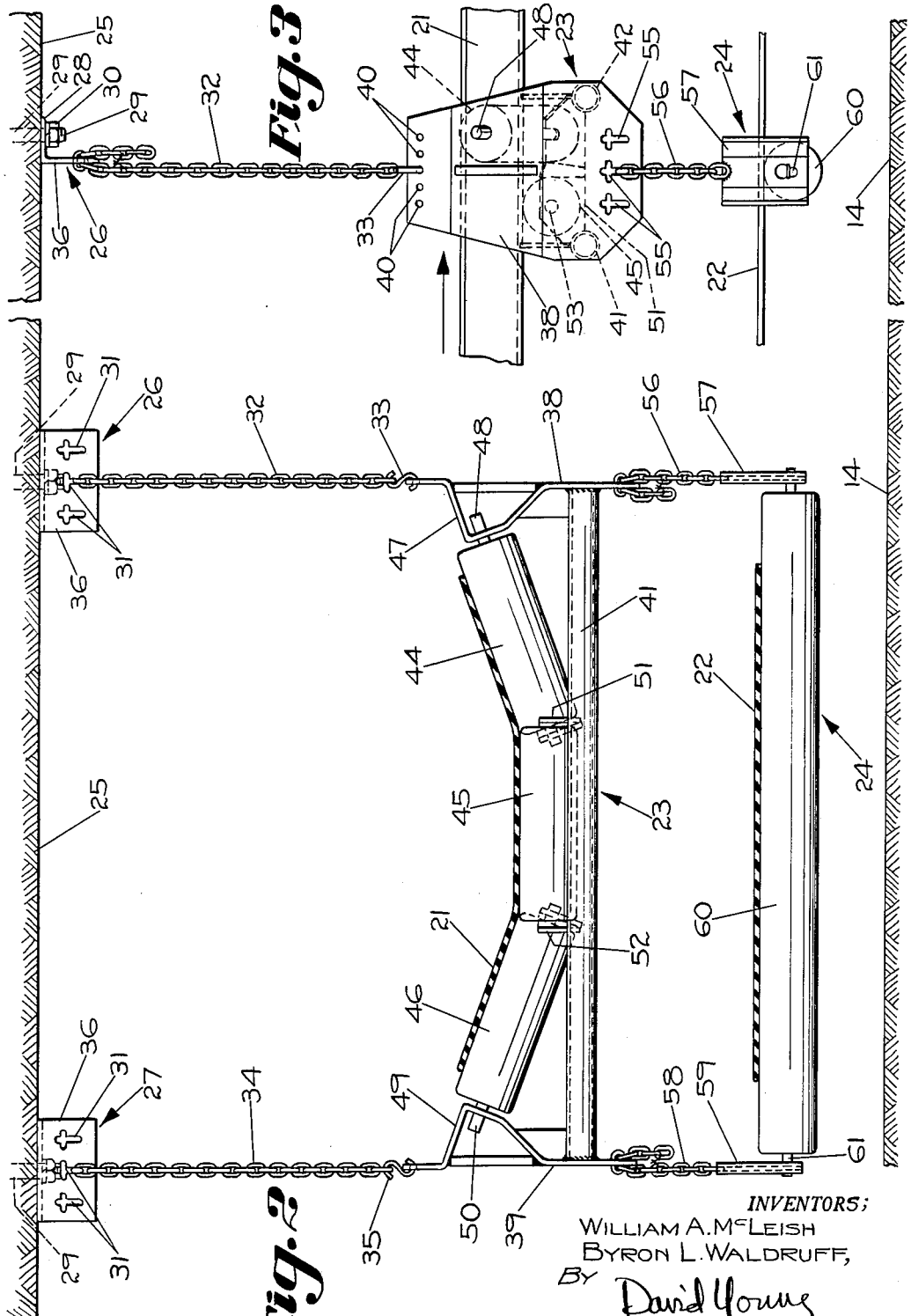
INVENTORS;
WILLIAM A. McLEISH
BYRON L. WALDRUFF,
By David Young
ATT'Y.

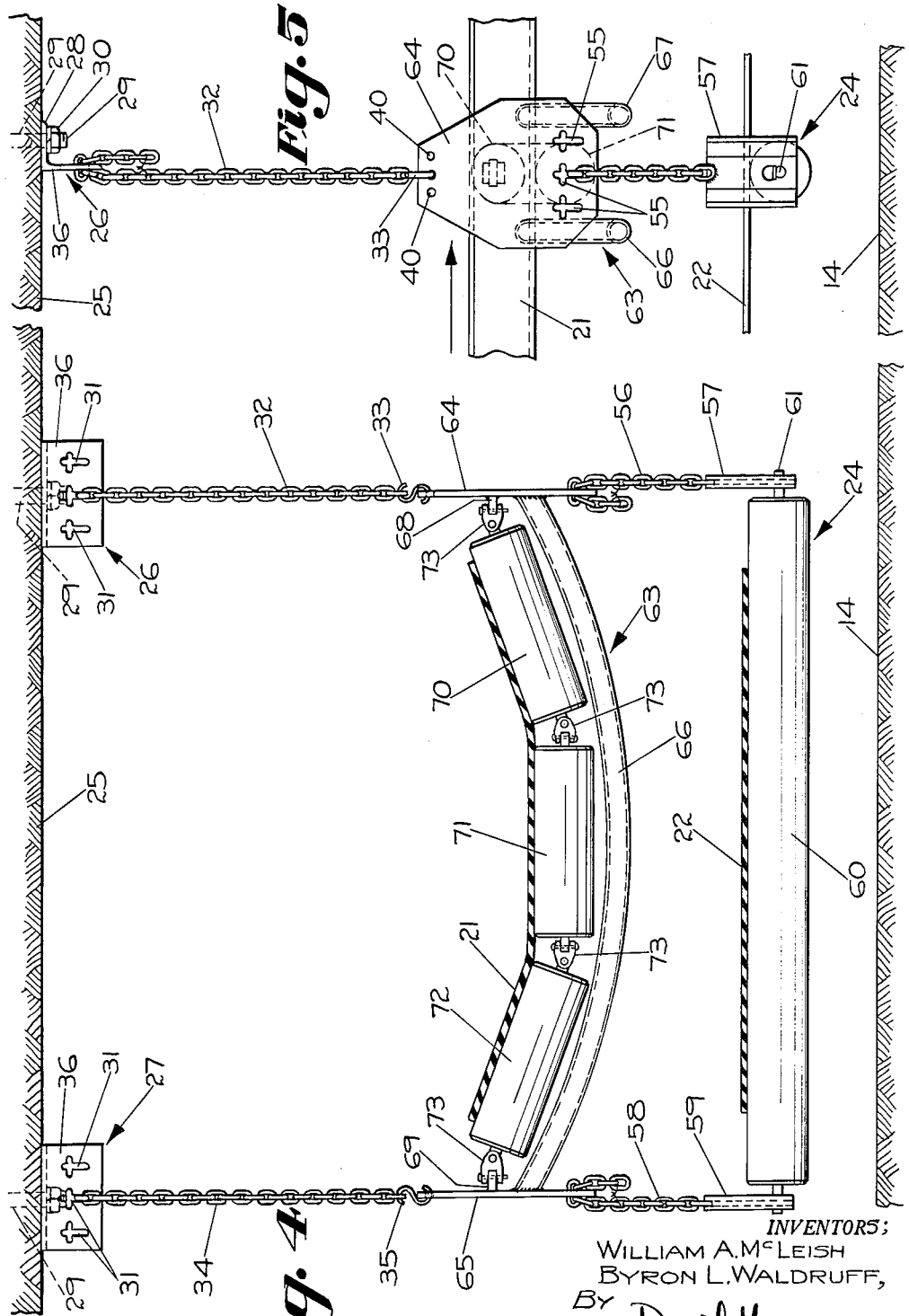

United States Patent Office 3,212,626
Patented Oct. 19, 1965

3,212,626
SUSPENDED BELT CONVEYOR
William A. McLeish and Byron L. Waldruff, Columbus, Ohio, assignors to Jeffrey Galion Manufacturing Company, a corporation of Ohio
Filed Mar. 15, 1962, Ser. No. 179,986
5 Claims. (Cl. 198—192)

The instant invention relates to belt conveyors, and more particularly to a belt conveyor which is suspended and which is especially adapted for use in underground conveyor installations, such as are found in underground coal mines.

In underground mines, belt conveyors are utilized for removing the mined material from the mining site. As the mining operations advance into the mine, or as the mining operations may be moved from one site to another site, the conveyors must be moved accordingly, to follow the mining operations. It is therefore required that the conveyor be capable of disassembly to facilitate movement thereof from one place to another place in the mine. For this purpose, it is required that it be possible to disassemble the conveyor into a number of parts of such size that they can readily be moved and conveniently and quickly reassembled at another location.

It is, accordingly, an object of the instant invention to provide a belt conveyor which can be readily and quickly moved from one location to another.

It is another object of the instant invention to provide a belt conveyor consisting of a number of parts which are relatively light in weight, to permit the conveyor to be conveniently moved.

It is a further object of the instant invention to provide a belt conveyor in which the elements thereof may be easily assembled or disassembled.

It is also an object of the instant invention to provide a belt conveyor in which the idler assemblies are freely suspended.

Still another object of the instant invention is to provide a belt conveyor in which the idler assemblies are each independently suspended from an overhead support.

It is still another object of the instant invention to provide a belt conveyor in which the idler assemblies are flexibly suspended from a mine roof, and in which the positions of the idler assemblies may be readily adjusted.

A still further object of the instant invention is to provide a belt conveyor in which the conveying run idler assemblies are suspended from a mine roof, and the return run idler assemblies are suspended from the conveying run idler assemblies.

Other objects of the instant invention will appear hereinafter, the novel features and combinations being set forth in the appended claims.

In the drawings:

FIG. 1 is a side elevational view of a belt conveyor constructed in accordance with the instant invention;

FIG. 2 is a transverse elevational view of the belt conveyor illustrating a suspended idler assembly, and taken on the line 2—2 in FIG. 1;

FIG. 3 is a side elevational view of the suspended idler assembly illustrated in FIG. 2;

FIG. 4 is a transverse elevational view similar to FIG. 2, and illustrating a modified form of idler assembly;

FIG. 5 is a side elevational view of the idler assembly illustrated in FIG. 4;

FIG. 6 is a partial transverse elevational view similar to FIG. 2, and illustrating still another form of the suspended idler assembly; and FIG. 7 is a side elevational view of the idler assembly illustrated in FIG. 6.

Referring to the drawings, there is illustrated in FIG. 1 a belt conveyor 10 constructed in accordance with the instant invention, and comprising a tail assembly 11 and a head assembly 12, which are diagrammatically illustrated in FIG. 1. The tail assembly 11 comprises a suitable supporting base 13, which is placed on the mine floor 14. A tail pulley 15 is rotatably supported on the base 13. The head assembly 12 similarly comprises a suitable base 16, placed on the mine floor 14 and rotatably supporting a head pulley 17. The base 16 also supports suitable drive means 18, by which the head pulley 17 is driven.

A conveyor belt 20 is trained about the tail pulley 15 and the head pulley 17 and operates in an upper conveying run 21 and a lower return run 22. The conveying run 21 travels in the direction from the tail pulley 15 to the head pulley 17, as indicated by the arrow in FIG. 1. The conveying run 21 is supported by a plurality of conveying run idler assemblies 23, and the return run 22 is supported by a plurality of return run idler assemblies 24. The idler assemblies 23, 24 are disposed at a plurality of positions intermediate the tail and head pulleys 15, 17, to support the conveyor belt 20 along its full length between the tail and head pulleys 15, 17. The conveying run idler assemblies 23 are suspended from the mine roof 25, and the return run idler assemblies 24 are suspended from the conveying run idler assemblies 23, as will be described in greater detail hereinafter.

Referring to FIGS. 2 and 3, there is illustrated therein, in greater detail, the suspended conveying run idler assembly 23 and the suspended return run idler assembly 24. The conveying run idler assemblies 23 are suspended from the mine roof 25. At one side of the belt conveyor 10 there is provided an overhead supporting element 26, which may be formed from an angle. At the other side of the belt conveyor 10 there is provided another overhead supporting element 27, which may be identical in all respects with the overhead supporting element 26. The overhead supporting element 26 includes a lateral leg 28, which lays flush against the mine roof 25, and a roof bolt 29 extends through the lateral leg 28, with the nut 30 being turned up on the roof bolt 29 against the lateral leg 28, to fixedly secure the overhead supporting element 26 to the roof 25. The roof bolts 29 are customarily used in mines for supporting the roof, to prevent roof falls from occurring. The lateral leg 28 of the overhead supporting element 26 may be formed with a suitable aperture, to permit the lateral leg 28 to be placed over the end of the roof bolt 29 prior to applying the nut 30. As an alternative, the lateral leg 28 may be provided with an open ended slot, by which the lateral leg 28 may be slipped over the roof bolt 29 merely by loosening the nut 30, and thereby avoiding the necessity of removing the nut 30 for installation of the overhead supporting element 26.

The overhead supporting element 26 is laterally disposed with respect to the direction of the belt conveyor 10. The depending leg 36 of the overhead supporting element 26 includes a plurality of slots 31, each having a cruciform configuration. In the illustrated embodiment of the invention, three slots 31 are provided, and these are aligned laterally of the direction of the belt conveyor 10.

A link chain 32 depends from the overhead supporting element 26. The cruciform configuration of the slots 31 permits the link chain 32 to be drawn through a slot 31 and then dropped down into the slot for securing the chain 32 in place. The depending length of the chain 32 is adjusted by drawing the chain 32 to a greater or lesser extent through the slot 31. An S-hook 33 is hooked to the last link of the chain 32, and is connected to the conveying run idler assembly 23 for suspending the latter. At the other side of the belt conveyor 10 there is provided a link chain 34, which is similar in all respects to the link chain 32, and it also is provided with an S-hook 35, which connects to the conveying run idler assembly 23.

The conveying run idler assembly 23 is provided with a side plate 38 forming a hanger for the idler assembly 23. At the other side of the conveying run idler assembly 23 there is provided another side plate 39, which is identical to the side plate 38, but is oppositely disposed. The side plate 39 forms a hanger for the other side of the idler assembly 23. The top of the side plate 38 is formed with a plurality of apertures 40, any one of which may receive the S-hook 33 for connection of the conveying run idler assembly 23 to the flexible chain 32. In the illustrated embodiment of the invention there are provided five apertures 40, which are aligned in the direction of the belt conveyor 10. However, it will be understood that the number of apertures 40 may be varied.

The opposite side plates 38, 39 are secured in assembly by a pair of spreader elements 41, 42, which may be formed of ordinary pipe. The opposite ends of the spreader elements 41, 42 are fixedly secured to the side plates 38, 39, as by welding, to form a rigid assembly. The spreader elements 41, 42 are spaced from each other, as best seen in FIG. 3, to permit the idler rolls 44, 45, 46 to be supported between the spreader elements 41, 42.

The intermediate portion of the side plate 38 is deformed inwardly to provide a supporting bracket 47 for the axle 48 of the idler roll 44. The side plate 39 is similarly deformed inwardly to provide a supporting bracket 49 for the axle 50 of the idler roll 46. A pair of intermediate idler roll supporting brackets 51, 52 are fixedly secured to and across the spreader elements 41, 42, as by welding. The intermediate bracket 51 supports the axle 48 of the idler roll 44, and the intermediate bracket 52 similarly supports the axle 50 of the idler roll 46. The idler roll 45 is disposed between the intermediate brackets 51, 52, and the latter support the axle 53 of the idler roll 45. The idler rolls 44, 45, 46 are rotatably supported on the respective axles 48, 53, 50 and are freely rotatable. The intermediate idler roll 45 is disposed on a substantially horizontal axis, and the idler rolls 44, 46 are oppositely inclined, upwardly and outwardly, to provide a troughed disposition of the several idler rolls, to engage the conveying run 21 of the conveyor belt and to form it in a troughed configuration.

In the lower portion of the side plate 38 there is provided a plurality of slots 55, each having a cruciform configuration. In the illustrated embodiment of the invention three slots 55 are provided. However, it will be understood that the number of such slots may be varied. The slots 55 are aligned in the direction of the belt conveyor 10. A link chain 56 is drawn through a selected one of the slots 55, and a link of the chain 56 is dropped down into the slot to retain the chain 56 in the selected slot 55. The chain 56 depends from the side plate 38, and the last link of the chain 56 is secured to a side bracket 57 of the return idler assembly 24. A link chain 58 is similarly secured to the opposite side plate 39, and the last link of the chain 58 is secured to the side bracket 59 of the return idler assembly 24. The chains 56, 58 depend from the conveying run idler assembly 23, and the depending length of the chains 56, 58 is determined by the extent to which they are drawn through the selected slots 55.

The return idler roll 60 is rotatably mounted on an axle 61 for free rotation. The opposite ends of the axle 61 are received in the side brackets 57, 59, whereby the return idler roll 60 is supported. The return idler roll 60 engages the return run 22 of the conveyor belt to support the latter. The return idler assembly 24 is suspended by the chains 56, 58 below and from the conveying run idler assembly 23.

Referring to FIGS. 4 and 5, the invention as illustrated therein is similar in all respects to the form of the invention illustrated in FIGS. 2 and 3. However, the conveying run idler assembly 63 is modified. In the conveying run idler assembly 63 the side plates 64, 65 are planar. A pair of curved spreader elements 66, 67 extend between the side plates 64, 65, and are secured thereto as by welding, to form a rigid assembly of the side plates 64, 65 and the spreader elements 66, 67. A bracket 68 is fixedly secured to the inner side of the side plate 64, and a similar bracket 69 is fixedly secured to the inner side of the side plate 65. The idler rolls 70, 71, 72 are flexibly secured to the brackets 68, 69, and to each other, to permit the idler rolls 70, 71, 72 to adjust their positions relatively to each other. Links 73 are utilized to connect the idler rolls 70, 72 to the brackets 68, 69, and to connect the idler rolls 70, 71, 72 to each other. Each link provides pivotal connections on two axes, disposed at right angles to each other, to provide a universal connection of the idler rolls to each other, and of the idler rolls to the brackets 68, 69. Other than as described, the structure shown in FIGS. 4 and 5 is the same as that illustrated in FIGS. 2 and 3, and the same reference numerals have been used to identify identical parts.

In FIGS. 6 and 7 there is illustrated another modification of the invention, in which the conveying run idler assembly 74 comprises a side plate 75 which is planar. To the inner side of the side plate 75 there is secured a bracket 76 which provides the support for the axle 48 of the idler roll 44. At the opposite side of the idler assembly 74 (not illustrated) there is provided a side plate and bracket similar in all respects to the side plate 75 and the bracket 76, but oppositely disposed. Otherwise, the structure is the same as that previously described, and the identical parts are identified by the same reference numerals as have been used in FIGS. 2 and 3.

To install the belt conveyor 10 in the mine, two rows of roof bolts 29 are placed along the mine roof 25, paralleling the direction of the belt conveyor 10. The roof bolts 29 are spaced in accordance with the desired spacing of the conveying run idler assemblies 23. Thereafter, the overhead supporting elements 26, 27 are secured to the roof by the roof bolts 29, and the idler assemblies 23 are then suspended from the overhead supporting elements 26, 27, as previously described. The return run idler assemblies 24 are then suspended from the conveying run idler assemblies 23.

In the course of placing the roof bolts 29 there may be some inaccuracies in precisely aligning the roof bolts 29 in two lines paralleling the course of the belt conveyor 10. However, each of the overhead supporting elements 26, 27 is provided with a plurality of slots 31, which permits compensation in a lateral direction for any misalignment of the roof bolts 29. This is to say that the chains 32, 34 may be engaged with any selected slot 31 in the overhead supporting elements 26, 27, which will result in proper placement of the suspended conveying run idler assembly 23. This compensation for misalignment is in a lateral direction with respect to the direction of the belt conveyor 10. The provision of a plurality of apertures 40 in each of the side plates 38, 39 also permits adjustment of the position of the conveying run idler assembly 23, this being in a direction paralleling the direction of the belt conveyor 10, it being understood that the S-hooks 33, 35 may be engaged with selected ones of the apertures 40 in the opposite side plates 38, 39.

In a similar manner the return run idler assembly 24 may be properly aligned in the path of the conveyor return run 22 by engagement of the chains 56, 58 with selected ones of the slots 55 in the opposite side plates 38, 39. Also, should there be any off-balance of the suspended conveying run idler assembly 23, this may also be compensated by selective positioning of the return run idler assembly 24 to one side or the other of the center line of the conveying run idler assembly 23.

In a belt conveyor in which the idlers are fixedly secured in place, the idlers have a training effect on the conveyor belt. Should there be any misalignment of idlers in such a conveyor, the training effect of such misaligned idlers results in training the conveyor belt out of center. However, in the conveyor constructed in accordance with the instant invention, wherein the idler assemblies are suspended the belt is controlling, and rather than a misaligned idler assembly causing the belt to run out of center, the belt will tend to maintain its center position and will cause the idler assembly to shift its position to properly align itself with the belt. Thus, there is no problem of proper training of the belt, although there may be some slight problem in accurately installing the idler assemblies, which, of course, relates back to precise placement of the roof bolts. It has also been noted that the movement of the belt across the idler assemblies has a stabilizing effect on the suspended idler assemblies, and there is no noticeable swinging of the idler assemblies, even though they are freely suspended from the roof.

When it is desired to move the conveyor to another location, the return idler assemblies 24 are readily separated from the conveying run idler assemblies 23, and the latter are similarly separated from the overhead supporting elements 26, 27. The several idler assemblies are relatively light in weight, and these can be easily carried to the new location in the mine. In the course of moving the conveyor, the conveyor belt 20 can be released and rolled in the usual manner for transportation to the new location, and the tail and head assemblies 11, 12 can also be moved in the usual manner. The ease with which the conveyor may be disassembled, permits it to be rapidly moved to another location, and assembled at the other location.

Obviously those skilled in the art may make various changes in the details and arrangement of parts without departing from the spirit and scope of the invention as defined by the claims hereto appended, and applicants therefore wish not to be restricted to the precise construction herein disclosed.

Having thus described and shown an embodiment of the invention, what it is desired to secure by Letters Patent of the United States is:

1. In a belt conveyor, means for supporting the conveyor belt thereof in a longitudinally extending run comprising, an overhead supporting element disposed transversely of the conveyor belt run, an idler assembly disposed transversely of the conveyor belt run to support the belt in its run, flexible suspension means connected to said overhead supporting element and depending therefrom to the idler assembly, said suspension means being connected to the idler assembly for supporting the idler assembly, said overhead supporting element having a plurality of positions for connecting the flexible suspension means thereto which are spaced from each other and are disposed transversely of the conveyor belt run to connect the flexible suspension means at a selected one of said plurality of positions, and said idler assembly having a plurality of positions for connecting the flexible suspension means thereto which are spaced from each other and are disposed along the longitudinal direction of the conveyor belt run to connect the flexible suspension means at a selected one of said plurality of positions, and the idler assembly being thereby selectively positioned in the conveyor belt run to evenly support and guide the belt.

2. In a belt conveyor as recited in claim 1, said suspension means including a flexible chain, an aperture at each of said positions of the supporting element and an aperture at each of said positions of the idler assembly, said flexible chain being connected to the overhead supporting element by engagement with one of the apertures and being connected to the idler assembly by engagement with one of the apertures thereof.

3. In a belt conveyor as recited in claim 2, said chain comprising a plurality of links joined to each other crosswise with respect to each other, the apertures in the overhead supporting element being of cruciform configuration for engagement of the chain therewith, and a hook secured to the chain for engagement with a selected aperture of the idler assembly.

4. In a belt conveyor as recited in claim 1, including an overhead supporting element at each side of the belt conveyor, said idler assembly including a side member at each side of the belt conveyor, said flexible suspension means including a flexible chain at each side of the belt conveyor depending from a supporting element and connected to a side member of the idler assembly.

5. In a belt conveyor as recited in claim 1, a second idler assembly disposed below the first said idler assembly for supporting and guiding another run of the conveyor belt, flexible suspension means connected to the first said idler assembly and depending therefrom and connected to the second idler assembly to flexibly suspend the second idler assembly below the first said idler assembly.

References Cited by the Examiner

UNITED STATES PATENTS

| 1,144,593 | 6/15 | Heiser | 248—59 |
| 3,002,606 | 10/61 | Lo Presti. | |
| 3,062,360 | 11/62 | Arndt et al. | 198—184 |
| 3,075,631 | 1/63 | Arndt et al. | 198—192 |

FOREIGN PATENTS

| 989,934 | 5/51 | France. |
| 363,054 | 11/22 | Germany. |
| 461,751 | 6/28 | Germany. |
| 738,598 | 9/43 | Germany. |

SAMUEL F. COLEMAN, *Primary Examiner.*

WILLIAM B. LA BORDE, *Examiner.*